United States Patent
Oslizlo et al.

(10) Patent No.: US 9,333,947 B2
(45) Date of Patent: May 10, 2016

(54) WINDSCREEN WIPER DEVICE

(71) Applicant: Federal-Mogul Corporation, Southfield, MI (US)

(72) Inventors: Michael Oslizlo, Milan, MI (US); Dennis E. Cox, Belleville, MI (US)

(73) Assignee: Federal-Mogul Corporation, Southfield, MI (US)

( * ) Notice: Subject to any disclaimer, the term of this patent is extended or adjusted under 35 U.S.C. 154(b) by 174 days.

(21) Appl. No.: 13/714,800

(22) Filed: Dec. 14, 2012

(65) Prior Publication Data
US 2013/0152365 A1 Jun. 20, 2013

Related U.S. Application Data

(60) Provisional application No. 61/570,563, filed on Dec. 14, 2011.

(51) Int. Cl.
*B60S 1/40* (2006.01)
*B60S 1/38* (2006.01)
(Continued)

(52) U.S. Cl.
CPC .... *B60S 1/40* (2013.01); *B60S 1/32* (2013.01); *B60S 1/38* (2013.01); *B60S 1/3801* (2013.01);
(Continued)

(58) Field of Classification Search
CPC ...... B60S 1/524; B60S 1/3808; B60S 1/3801; B60S 1/3863; B60S 1/3858; B60S 1/3896; B60S 1/3851; B60S 1/3887; B60S 1/381; B60S 1/4006; B60S 1/4016; B60S 1/4009; B60S 2001/3836; B60S 2001/3813; B60S 2001/3812; B60S 2001/3898; B60S 2001/3815

USPC .......... 15/250.361, 250.43, 250.41, 250.451, 15/250.44, 250.454, 250.46, 250.47; 29/428, 450, 448, 469
See application file for complete search history.

(56) References Cited

U.S. PATENT DOCUMENTS 2,767,419 A 10/1956 Horton
3,192,551 A 7/1965 Appel
(Continued)

FOREIGN PATENT DOCUMENTS

CN 1647980 A 8/2005
CN 101456407 A 6/2009
(Continued)

OTHER PUBLICATIONS

"Trico Teflon Shield", http://www.tricoproducts.com/Trade/WiperProducts/BeamBlades/TeflonShield; Dec. 12, 2012.
(Continued)

*Primary Examiner* — Essama Omgba
(74) *Attorney, Agent, or Firm* — Robert L. Stearns; Dickinson Wright, PLLC (57) ABSTRACT

A method of making a windscreen wiper device is provided. The method includes the step of preparing a wiper strip and at least one carrier element in engagement with the wiper strip. The at least one carrier element extends in a longitudinal direction between opposite ends to bias the wiper strip into a predetermined configuration. The method proceeds with sliding a first component of a frame structure onto one of the ends of the at least one carrier element and sliding a second component of the frame structure onto one of the ends of the carrier element. The method continues with the step of coupling the first and second components of the frame structure with one another only after the first and second components are both slid into engagement with the at least one carrier element.

5 Claims, 5 Drawing Sheets

(51) Int. Cl.
*B23P 11/00* (2006.01)
*B60S 1/32* (2006.01)

(52) U.S. Cl.
CPC .......... *B60S 1/3806* (2013.01); *B60S 2001/382* (2013.01); *B60S 2001/3813* (2013.01); *B60S 2001/3843* (2013.01); *Y10T 29/49826* (2015.01)

(56) References Cited

U.S. PATENT DOCUMENTS

| | | | |
|---|---|---|---|
| 3,317,946 A | 5/1967 | Anderson | |
| 4,028,770 A | 6/1977 | Appel | |
| 4,675,934 A * | 6/1987 | Dal Palu | 15/250.46 |
| 4,807,326 A | 2/1989 | Arai et al. | |
| 5,048,145 A * | 9/1991 | Takahashi et al. | 15/250.46 |
| 5,257,436 A | 11/1993 | Yang | |
| 5,325,563 A | 7/1994 | Cayan | |
| 5,383,248 A * | 1/1995 | Ho | 15/250.32 |
| 5,383,249 A * | 1/1995 | Yang | 15/250.201 |
| 5,465,454 A * | 11/1995 | Chang | 15/250.41 |
| 5,497,528 A * | 3/1996 | Wu | 15/250.46 |
| 5,666,687 A * | 9/1997 | Charng | 15/250.201 |
| 5,819,362 A * | 10/1998 | Charng | 15/250.32 |
| 5,862,567 A * | 1/1999 | Kim | 15/250.201 |
| 6,000,093 A | 12/1999 | Charng | |
| 6,038,730 A | 3/2000 | Chen | |
| 6,336,243 B1 * | 1/2002 | Charng | 15/250.201 |
| 6,973,697 B2 * | 12/2005 | Shen | 15/250.201 |
| 7,370,385 B2 * | 5/2008 | Chiang | 15/250.43 |
| 7,373,688 B2 | 5/2008 | Aoyama et al. | |
| 7,526,832 B2 | 5/2009 | Matsumoto et al. | |
| 7,603,742 B2 | 10/2009 | Nakano et al. | |
| 7,636,980 B2 | 12/2009 | Nakano | |
| 7,775,337 B2 | 8/2010 | Moshenrose et al. | |
| 7,836,541 B2 | 11/2010 | Harita et al. | |
| 7,921,503 B1 | 4/2011 | Chiang | |
| 7,945,986 B2 * | 5/2011 | Kim | 15/250.201 |
| 8,015,656 B2 | 9/2011 | Fujiwara et al. | |
| 8,028,368 B2 * | 10/2011 | Chien | 15/250.201 |
| 8,181,308 B2 * | 5/2012 | Kwon et al. | 15/250.46 |
| 8,191,200 B2 | 6/2012 | Kim | 15/250.32 |
| 8,413,291 B2 * | 4/2013 | Wu | 15/250.201 |
| 8,510,898 B2 * | 8/2013 | Ku | 15/250.44 |
| 8,533,899 B2 * | 9/2013 | Weber | 15/250.361 |
| 8,701,241 B2 * | 4/2014 | Kim et al. | 15/250.32 |
| 8,819,889 B2 * | 9/2014 | Weber | 15/250.361 |
| 8,910,341 B2 * | 12/2014 | Park et al. | 15/250.46 |
| 8,978,192 B2 * | 3/2015 | Kwon | 15/250.32 |
| 9,009,910 B2 * | 4/2015 | Yang et al. | 15/250.46 |
| 2002/0083545 A1 * | 7/2002 | Chen | 15/250.41 |
| 2005/0166349 A1 * | 8/2005 | Nakano et al. | 15/250.201 |
| 2005/0246852 A1 * | 11/2005 | Shen | 15/250.201 |
| 2006/0191094 A1 * | 8/2006 | Dace-Smith et al. | 15/250.44 |
| 2007/0017055 A1 | 1/2007 | Simko | |
| 2008/0028564 A1 | 2/2008 | Ku | |
| 2008/0098559 A1 | 5/2008 | Machida et al. | |
| 2008/0134456 A1 | 6/2008 | Choi | |
| 2008/0155776 A1 | 7/2008 | Harita | |
| 2008/0289133 A1 * | 11/2008 | Kim | 15/250.32 |
| 2009/0044365 A1 | 2/2009 | Koppen et al. | |
| 2009/0113653 A1 * | 5/2009 | Thienard | 15/250.32 |
| 2010/0139027 A1 * | 6/2010 | An et al. | 15/250.361 |
| 2010/0293738 A1 | 11/2010 | Kim et al. | |
| 2011/0041280 A1 | 2/2011 | Choi et al. | |
| 2011/0056041 A1 * | 3/2011 | Wu | 15/250.32 |
| 2011/0107541 A1 * | 5/2011 | Caillot et al. | 15/250.04 |
| 2011/0113580 A1 * | 5/2011 | Caillot et al. | 15/250.01 |
| 2011/0131750 A1 | 6/2011 | Kwon et al. | |
| 2011/0162161 A1 * | 7/2011 | Amado | 15/250.361 |
| 2011/0162162 A1 | 7/2011 | Fujiwara et al. | |
| 2011/0258802 A1 | 10/2011 | Op'T Roodt et al. | |
| 2011/0265309 A1 | 11/2011 | Koppen et al. | |
| 2012/0124767 A1 * | 5/2012 | Thielen et al. | 15/250.361 |
| 2012/0167328 A1 * | 7/2012 | Song et al. | 15/250.361 |
| 2012/0180245 A1 * | 7/2012 | Ku | 15/250.32 |
| 2013/0133152 A1 | 5/2013 | Op'T Roodt et al. | |
| 2013/0152327 A1 * | 6/2013 | Oslizlo et al. | 15/250.38 |
| 2013/0152328 A1 * | 6/2013 | Oslizlo et al. | 15/250.38 |
| 2013/0152329 A1 * | 6/2013 | Oslizlo et al. | 15/250.201 |
| 2013/0305478 A1 * | 11/2013 | Kim et al. | 15/250.451 |
| 2013/0333149 A1 * | 12/2013 | Park et al. | 15/250.351 |
| 2014/0000058 A1 * | 1/2014 | Kim et al. | 15/250.201 |
| 2014/0053361 A1 | 2/2014 | Amano | 15/250.453 |
| 2014/0068887 A1 * | 3/2014 | Lee | 15/250.32 |
| 2014/0150198 A1 * | 6/2014 | Kim et al. | 15/250.32 |

FOREIGN PATENT DOCUMENTS

| | | |
|---|---|---|
| CN | 201357813 Y | 12/2009 |
| CN | 101654893 A | 6/2010 |
| CN | 101890919 A | 11/2010 |
| CN | 101959726 A | 1/2011 |
| CN | 101977800 A | 2/2011 |
| CN | 101992747 A | 3/2011 |
| CN | 102131682 A | 7/2011 |
| DE | 202006004273 U1 | 5/2006 |
| DE | 202011100429 U1 | 9/2011 |
| EP | 2105362 A1 | 9/2009 |
| EP | 2338747 A2 | 6/2011 |
| FR | 2403243 A1 | 4/1979 |
| FR | 2781741 A1 | 2/2000 |
| FR | 2847311 A1 | 5/2004 |
| GB | 2234670 A | 2/1991 |
| WO | 2007091397 A1 | 8/2007 |
| WO | 2011152507 A1 | 12/2011 |

OTHER PUBLICATIONS

"Denso Designer Blade", http://www.densoaftermarket.com/wiperblades.php; Dec. 12, 2012.

* cited by examiner

WINDSCREEN WIPER DEVICE

CROSS REFERENCE TO RELATED APPLICATION

This application claims the benefit of application Ser. No. 61/570,563, filed Dec. 14, 2011, the entire contents of which is hereby incorporated by reference.

BACKGROUND OF THE INVENTION

1. Field of the Invention

The present invention is related generally to windscreen wiper devices for automobiles and more particularly to hybrid windscreen wiper devices.

2. Related Art

The majority of automotive windscreen wiper devices, or wiper blades, can be categorized as either conventional-style wiper blades (hereinafter referred to as "conventional blades") or beam-style wiper blades (hereinafter referred to as "beam blades"). Conventional blades typically include an elongated wiper strip; at least one carrier element (also known as a flexor); and a frame structure with a connecting device for attachment to a wiper arm, a plurality of linkages and a plurality of claws. The carrier elements are generally linearly shaped when in a relaxed state, and the frame structure distributes a force from a wiper arm across the lengths of the carrier elements and the wiper strip while allowing the carrier elements and wiper strip to flex and conform to the curvature of a vehicle's windshield. This establishes a seal between the wiper strip and the windshield. The various components of the frame structure are typically connected to one another with a plurality of pins which are inserted through aligned holes in the different components and then deformed to establish permanent pivoting relationships between the different components.

Beam blades, in contrast to conventional blades, lack a frame structure. Instead, the carrier elements of beam blades are curved when in a relaxed state, and the connecting device is attached directly to the carrier element or elements. When a beam blade is pressed against a windshield, the curved carrier elements conform the wiper strip to the curvature of the windshield and press substantially the entire length of the wiper strip against the windshield to establish the seal between the wiper strip and the windshield. Beam blades also typically include one or more spoiler elements, which use a flow of air over the beam blade to apply a down force on the carrier elements and the wiper strip while the vehicle is in motion to further press the wiper.

Some wiper blade manufacturers have begun producing and marketing "hybrid blades" which include certain features from both conventional and beam blades. Such hybrid blades typically include a frame structure and a spoiler-shaped cover piece that is disposed over the frame structure. This gives the otherwise conventional blade the down force effect of beam blades. As with conventional blades, the frame structures of typical hybrid blades include multiple pieces that are pivotably coupled to one another with a plurality of deformed pins. However, the processes currently employed to couple these pieces to one another in such a way that they will not come apart during operation of the automobile may be time consuming and/or costly.

SUMMARY OF THE INVENTION

One aspect of the present invention is related to a method of making a windscreen wiper device. The method includes the step of preparing a wiper strip and at least one elongated carrier element in engagement with the wiper strip. Each carrier element extends in a longitudinal direction between opposite ends to bias the wiper strip into a predetermined configuration. The method proceeds with the steps of sliding a first component of a frame structure onto one of the ends of the carrier element or elements and sliding a second component of the frame structure onto one of the ends of the carrier element or elements. The method then continues with the step of coupling the first and second components of the frame structure with one another only after the first and second components are slid into engagement with the at least one carrier element. This process may be accomplished very quickly and at a lower cost as compared to other known processes for making windscreen wiper devices.

According to another aspect of the present invention, the first and second components are slid onto opposite ends of the at least one carrier element and each has a flange portion. The wiper strip and the at least one carrier element are trapped between the flange portions of the components to allow sliding movement of the wiper strip and the at least one carrier element relative to the frame structure within the confines established by the flange portions, thus reducing internal stresses within the wiper strip and the carrier elements when they are bent to conform with the curvature of a windshield. This is also advantageous because no crimping, cutting or other deforming processes are required to connect the frame structure with the carrier elements, thereby resulting in additional manufacturing costs savings.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
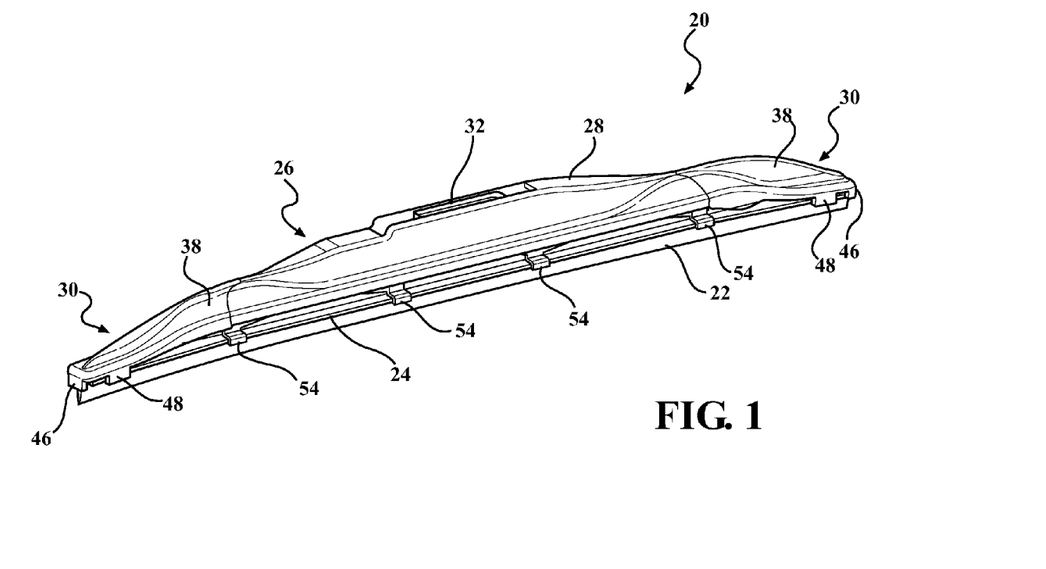
FIG. 1 is a perspective and elevation view of an exemplary wiper blade assembly.

Referring to the Figures, wherein like numerals indicate corresponding parts throughout the several views, an exemplary embodiment of a hybrid windscreen wiper device, or a hybrid wiper blade assembly 20, is generally shown in FIG. 1. The exemplary wiper blade assembly 20 includes a wiper strip 22 of a flexible and resilient material, such as rubber, for sealing against a vehicle's windshield and for driving rain, snow, ice or other elements away therefrom. The exemplary wiper strip 22 extends in a longitudinal direction and includes a pair of oppositely facing grooves that extend substantially the entire longitudinal length of the wiper strip 22. Carrier elements 24 (also known as flexors) are disposed in the grooves to bias the wiper strip 22 into a predetermined configuration. The carrier elements 24 are formed from thin strips of a flexible and spring-like material, such as spring steel, and extend in the longitudinal direction between opposite carrier ends. Preferably, the carrier elements 24 are slidably disposed in the grooves and are not locked into engagement with the wiper strip 22. This configuration has the effect of relieving internal stresses within the wiper strip 22 when it is bent to conform to the curvature of a windshield (not shown) to improve the wipe quality and durability of the wiper blade assembly 20. Alternately, the carrier elements 24 may be locked into engagement with the wiper strip 22 in one location without substantially increasing internal stresses within the wiper strip 22.

Figure 2:
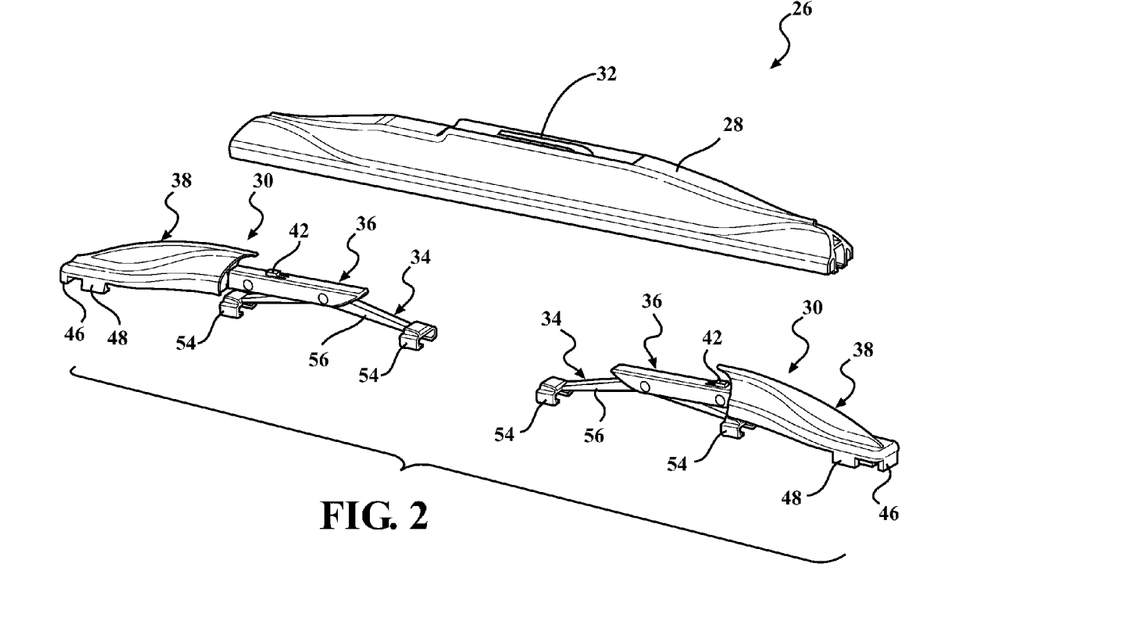
FIG. 2 is a partially exploded view of a frame structure of the wiper blade assembly of FIG. 1.

The wiper blade assembly 20 also includes a frame structure 26 which is coupled to the carrier elements 24 and distributes a force from a wiper arm (not shown) across a portion of the wiper strip 22 to seal that portion of the wiper strip 22 against the windshield. As best shown in the partially exploded view of FIG. 2, the exemplary frame structure 26 includes a main bridge 28 and a pair of end piece sub-assemblies 30 configured for attachment with opposite ends of the main bridge 28. A connecting device 32 is disposed in a generally central location of the main bridge 28 and is configured for attachment to an end of the wiper arm. The exemplary connecting device 32 is configured for attachment to a hook-style wiper arm. However, it should be appreciated that the connecting device 32 could be of a range of different designs for attaching with other types of wiper arms including, for example, pin-style wiper arms or bayonet-style wiper arms.

Figure 3:
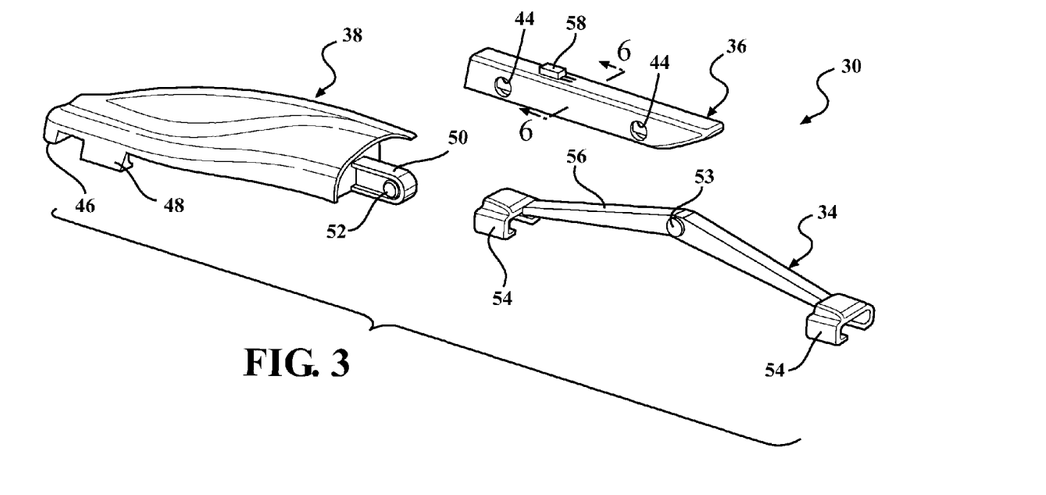
FIG. 3 is an exploded view of an end piece sub-assembly of the wiper blade assembly of FIG. 1.
Figures 6, 7:
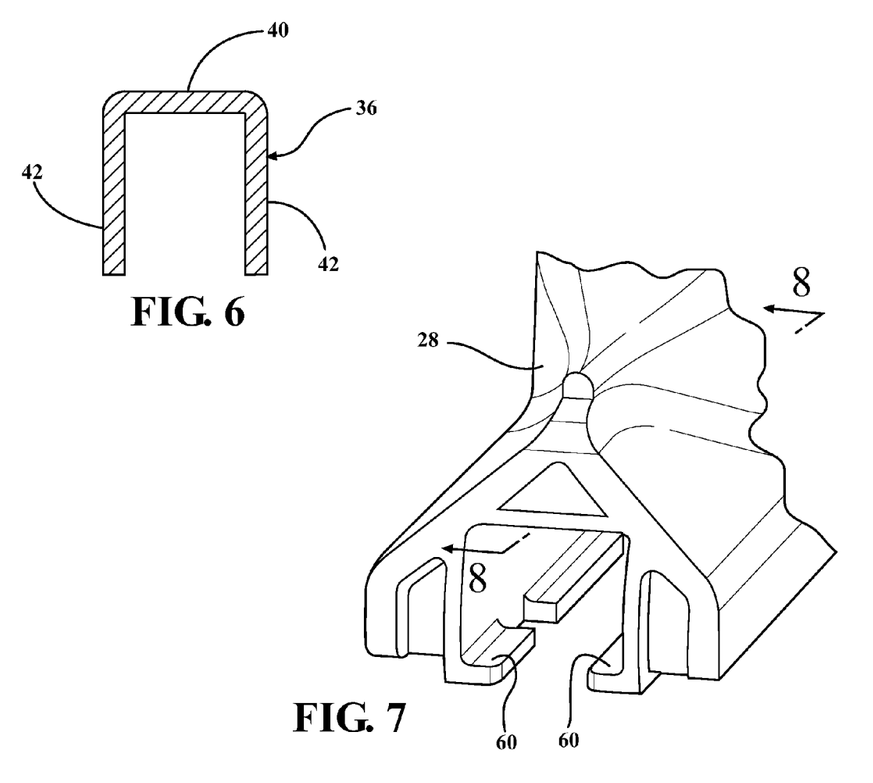
FIG. 6 is a cross-sectional view of an exemplary connecting piece taken along line 6-6 of FIG. 3.
FIG. 7 is a fragmentary view of a main bridge from the wiper blade assembly of FIG. 1.

Referring now to FIG. 3, an exploded view of one of the end piece sub-assemblies 30 is generally shown. Each end piece sub-assembly 30 includes a linkage 34, a connecting piece 36 and an end cap 38 (or end cover). As shown in FIG. 6, the exemplary connecting piece 36 is generally U-shaped as viewed in cross-section and has an upper wall 40 and a pair of side walls 42. Referring back to FIG. 3, the side walls 42 include two sets of apertures 44 spaced from one another.

Figure 4:
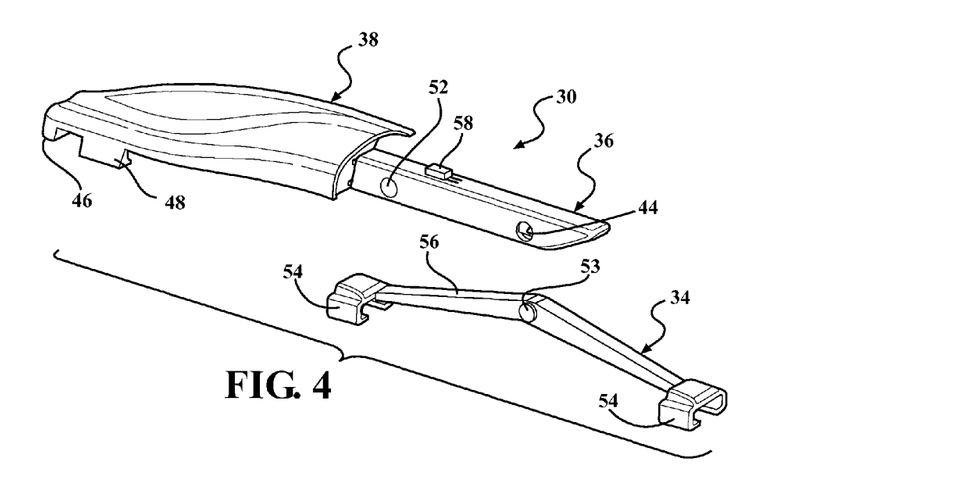
FIG. 4 is a partially exploded view of the end piece sub-assembly of FIG. 3 and showing an end cap pivotally connected to a connecting piece.

One end of the end cap 38 presents a downwardly extending flange portion 46 and a pair of generally L-shaped holding elements 48 for wrapping partially around the carrier elements 24 (shown in FIG. 1) to support the carrier elements 24 without restricting movement of the carrier elements 24 relative to the end cap 38 or the rest of the frame structure 26 in the longitudinal direction, i.e. the holding elements 48 are not clamped, staked or otherwise fixed onto the carrier elements 24. An outwardly extending tongue 50 with a pair of oppositely facing posts 52 is disposed on the end of the end cap 38 opposite of the downwardly extending flange portion 46. As shown in FIG. 4, the posts 52 on the tongue 50 are inserted into one of the sets of apertures 44 on the connecting piece 36 to establish a pivoting relationship between the end cap 38 and the connecting piece 36. The open bottom of the connecting piece 36 allows the end cap 38 to pivot downwardly, and the upper wall 40 of the connecting piece 36 serves as a stopping point to restrict pivoting of the end cap 38 upwardly past a certain point.

Figure 5:
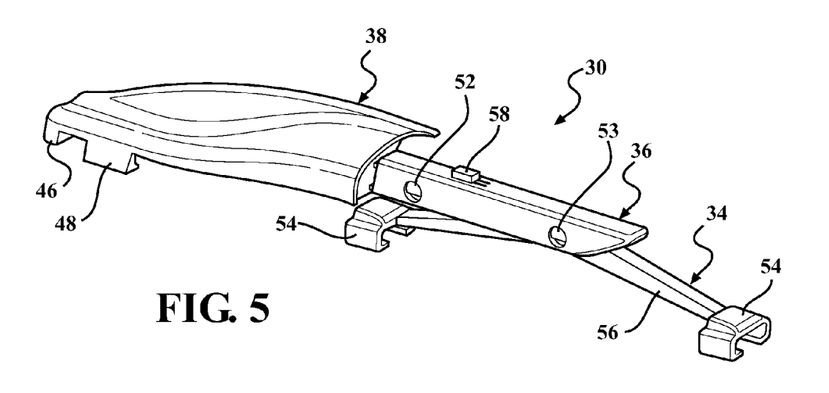
FIG. 5 is a perspective and elevation view of the end piece sub-assembly of FIG. 3.

The linkage 34 of each end piece sub-assembly 30 includes two sets of claws 54 spaced apart from one another. The sets of claws 54 are interconnected with one another through a V-shaped bridge 56 which has a pair of oppositely facing posts 53 disposed at its apex. As shown in FIG. 5, the posts 53 are inserted into one of the sets of apertures 44 in the connecting piece 36 to establish a pivoting relationship between the linkage 34 and the connecting piece 36. The open bottom of the U-shaped connecting piece 36 allows the linkage 34 to pivot in two directions. Similar to the holding elements 48 on the end caps 38, the claws 54 are in sliding (i.e. non-fixed) engagement with the exemplary carrier elements 24, thereby biasing the wiper strip 22 against the windshield while also allowing the carrier elements 24 and the wiper strip 22 to slide in the longitudinal direction relative to the linkages 34. This feature improves the wipe quality and durability of the wiper blade assembly 20 by reducing the internal stresses within the carrier elements 24 and the wiper strip 22 when they are bent to conform to the curvature of the windshield.

Referring still to FIG. 5, the upper wall 40 of the connecting piece 36 has a spring loaded and resilient tab 58 (or a bayonet) which is located lengthwise between the sets of apertures 44. The resilient tab 58 is only connected to the surrounding portions of the connecting piece 36 on one side so that the resilient tab 58 is at the end of a cantilever beam like portion of the connecting piece 36. The connecting piece 36 is formed of a polymeric material (or any other resilient and deflectable material), and the cantilever beam like portion provides the spring force to bias the resilient tab 58 into a predetermined position with it extending upwardly from an upper surface of the linkage 34.

Figure 8:
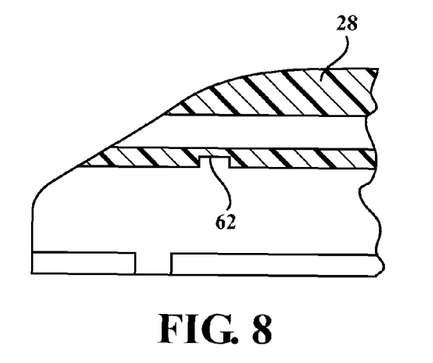
FIG. 8 is a cross-sectional view of the main bridge taken along line 8-8 of FIG. 7.
Figure 9:
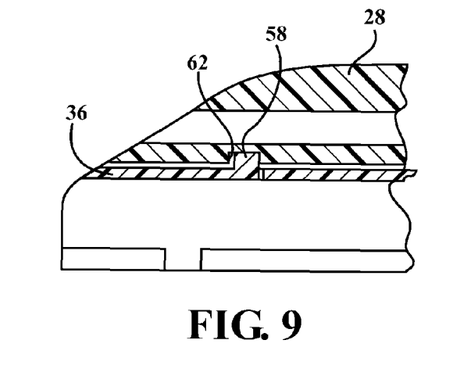
FIG. 9 is a cross-sectional view showing a resilient tab on a connecting piece received within a recess in the main bridge.

Referring now to FIG. 7, each end of the main bridge 28 includes a generally square or rectangularly shaped opening extending in the longitudinal direction. The bottom of the opening presents a pair of inwardly extending flanges 60 with an open slot being disposed between the flanges 60. As shown in FIG. 8, the top of the opening includes a recess 62 that is shaped similarly to the resilient flange 60 on the connecting device 32 and is spaced from an end of the main bridge 28. To connect an end piece sub-assembly 30 with the main bridge 28, the connecting piece 36 of the end piece sub-assembly 30 is inserted into the opening of the main bridge 28 until the resilient tab 58 snaps into engagement with the similarly-shaped recess 62 in the opening. This connection between the resilient tab 58 and the recess 62 in the opening is shown in FIG. 9 and is hereinafter referred to as a "bayonet connection". Because the resilient tab 58 is not readily accessible from outside of the main bridge 28, the bayonet connection between the main bridge 28 and the end piece sub-assembly 30 is, for all practical purposes, irreversible and permanent. This is important because, while the bayonet connection between the end piece sub-assembly 30 and the main bridge 28 may be quickly established, it is also strong and resistant to failure. Accordingly, in addition to the cost savings provided by the bayonet connection, there is little to no risk of the end piece subassemblies 30 becoming detached from the main bridge 28 during operation of the vehicle. An end of the connecting piece 36 is inclined to guide it into the opening of the main bridge 28 thereby allowing the bayonet connection to be more easily established.

The open slot between the flanges 60 on the main bridge 28 is thinner than the width of the connecting piece 36 to retain the connecting piece 36 within the opening but wider than the width of the linkages 34 to allow the linkages 34 to extend downwardly through the slot and to pivot relative to the main bridge 28.

Figure 10:
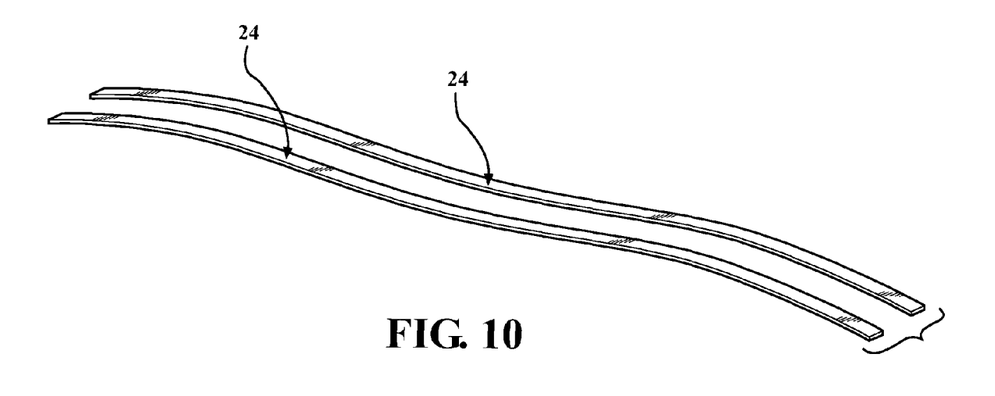
FIG. 10 is a perspective and elevation view of a pair of carrier elements from the wiper blade assembly of FIG. 1.

Referring now to FIG. 10, each of the exemplary carrier elements 24 is pre-shaped to be generally M-shaped with a pair of downwardly facing curves spaced from one another by an upwardly facing curve when it is in a relaxed, unstressed state before it is inserted into a groove in the wiper strip 22. This may have the effect of more uniformly pressing the wiper strip 22 against a curved windshield. However, it should be appreciated that the carrier elements 24 may be generally linearly shaped or they could have any desirable curvature or combination of curvatures when in the relaxed state.

Referring back to FIG. 1, the exterior surfaces of the end caps 38 and the main bridge 28 are generally spoiler shaped. This creates a down force to further bias the wiper strip 22 against the windshield and improve the seal established therebetween when the vehicle is travelling at speeds. In the exemplary embodiment, this aerodynamic down force is the only biasing force applied onto the carrier elements 24 and the wiper strip 22 by the end caps 38 which are freely pivotable relative to the main bridge 28.

Another aspect of the present invention is a method of making a windscreen wiper device. The method includes the step of preparing a wiper strip 22 and at least one elongated carrier element 24 in engagement with the wiper strip 22. Preferably, two carrier elements 24 are disposed in grooves in the wiper strip 22 to provide the engagement between the wiper strip 22 and the carrier elements 24. Each carrier element 24 extends in a longitudinal direction between opposite ends to bias the wiper strip 22 into a predetermined configuration.

The method proceeds with the steps of sliding a first component of a frame structure 26 onto one of the ends of the carrier element or elements 24 and sliding a second component of the frame structure 26 onto one of the ends of the carrier element or elements 24. Preferably, the first component is slid onto one end of the carrier element or elements 24 and the second component is slid onto the other end of the carrier element or elements 24.

The method then proceeds with the step of coupling the first and second components of the frame structure 26 with one another only after the first and second components are slid into engagement with the carrier element or elements 24. The coupling of the components is preferably a snap fitting process wherein a resilient tab 58 on one of the components springs into a similarly shaped recess 62 in the other component to establish a bayonet connection between the components.

Figure 11:
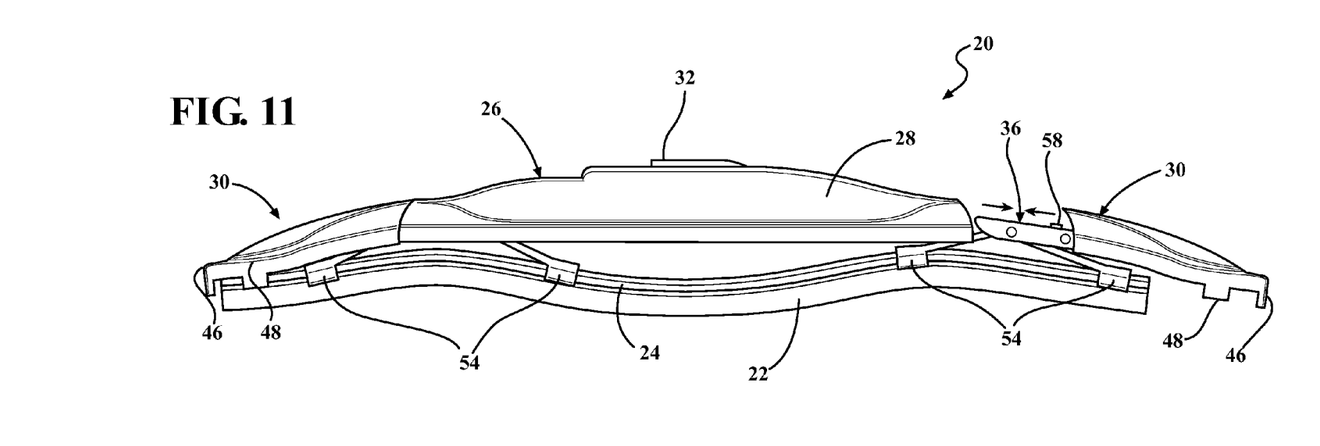
FIG. 11 is a perspective and elevation view showing a wiper blade assembly during one exemplary assembly process.

In one exemplary embodiment shown in FIG. 11, the first component is the combination of one of the end piece sub-assemblies 30 and the main bridge 28, which are coupled to one another before they are engaged with the carrier element 24 and the second component is the other end piece sub-assembly 30. As shown, the claws 54 and L-shaped holding elements 48 of the combined end piece sub-assembly 30 and the main bridge 28 are slid onto one end of the carrier elements 24, and the claws 54 and L-shaped holding elements 48 of the other end piece sub-assembly 30 is slid onto the other end of the carrier elements 24. These components are slid towards one another and the connecting piece 36 of the end piece sub-assembly 30 is inserted into the opening of the main bridge 28 until the resilient tab 58 snaps into the recess 62 in the main bridge 28 to complete the frame structure 26. Once the connection is established, the wiper strip 22 and carrier elements 24 are trapped between the flange portions 46 on the end caps 38 to prevent detachment of the wiper strip 22 or the carrier elements 24 from the frame structure 26 while still allowing the wiper strip 22 and carrier elements 24 to slide relative to the frame structure 26, thereby reducing internal stresses within either the wiper strip 22 or the carrier elements 24.

Figure 12:
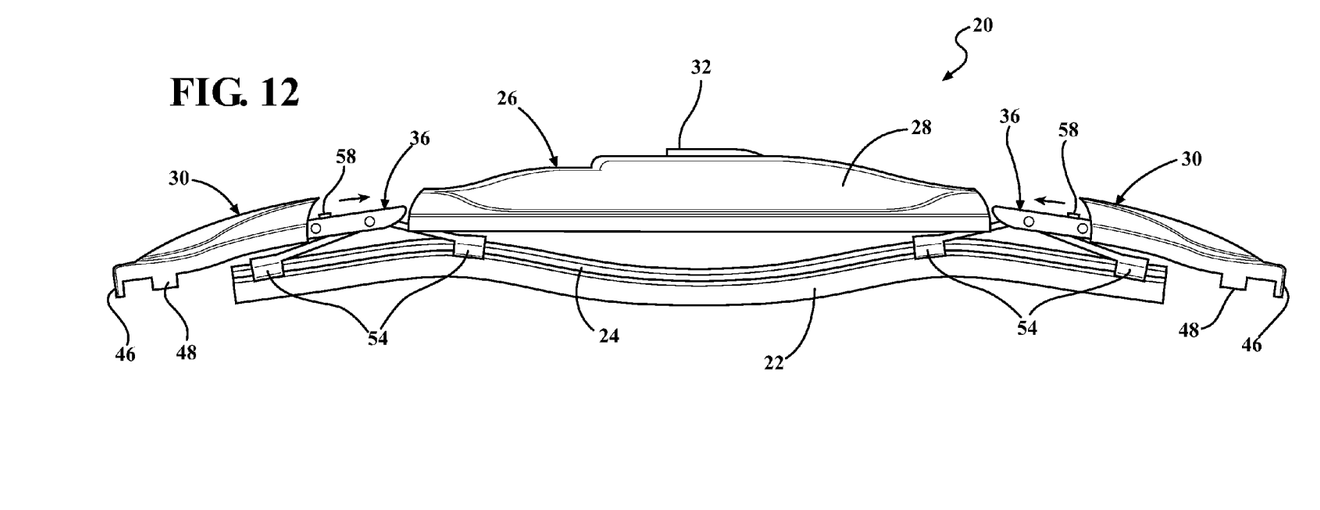
FIG. 12 is a perspective and elevation view showing a wiper blade assembly during a different exemplary assembly process.

In another exemplary embodiment shown in FIG. 12, the first and second components are the end piece sub-assemblies 30 and the main bridge 28 is a different third component. The main bridge 28 is held in a predetermined position relative to the wiper strip 22 and the carrier elements 24, and the end piece sub-assemblies 30 are slid onto opposite ends of the carrier elements 24. The connecting pieces 36 are inserted into the opposite openings of the main bridge 28 until the resilient tabs 58 snap into engagement with the recesses 62 to complete the frame structure 26. The end piece sub-assemblies 30 could be simultaneously snapped into engagement with the main bridge 28, or one end piece sub-assembly 30 could be snapped into engagement with the main bridge 28 before the other. As with the other exemplary embodiment, once the connections are established between the main bridge 28 and the end piece sub-assemblies 30, the wiper strip 22 and carrier elements 24 are trapped between the flange portions 46 of the end caps 38.

Obviously, many modifications and variations of the present invention are possible in light of the above teachings and may be practiced otherwise than as specifically described while within the scope of the appended claims.

What is claimed is:

1. A method of making a windscreen wiper device, comprising the steps of:
preparing a wiper strip and at least one elongated carrier element in engagement with the wiper strip and extending in a longitudinal direction between opposite ends to bias the wiper strip into a predetermined configuration;
sliding a first end piece sub-assembly of a frame structure onto one of the ends of the at least one carrier element;
sliding a second end piece sub-assembly of the frame structure onto one of the ends of the carrier element;
sliding the first and second end piece sub-assemblies of the frame structure into a locking engagement with opposite ends of a main bridge only after the first and second end piece sub-assemblies are both slid into engagement with the at least one carrier element; and
wherein at least one of said first and second end piece sub-assemblies includes a v-shaped bridge with two sets of claws.

2. The method as set forth in claim 1 wherein the step of sliding one component of the frame structure is further defined as sliding the first component onto a first end of the at least one carrier element and wherein the step of sliding the second component of the frame structure is further defined as sliding the second component of the frame structure onto a second end opposite of the first end of the at least one carrier element.

3. The method as set forth in claim 2 wherein the locking engagements between the first and second end piece sub-assemblies is a snap fitting engagement.

4. The method as set forth in claim 3 wherein each of said end piece sub-assemblies includes a resilient tab and the main bridge of the frame structure includes recesses that are shaped similarly to the resilient tabs for snappingly receiving the resilient tabs.

5. The method as set forth in claim 2 wherein the first and second end piece sub-assemblies each include a flange portion and wherein the wiper strip and at least one carrier element are trapped between the flange portions after the first and second end piece sub-assemblies are coupled with one another.

* * * * *